US010062103B2

(12) United States Patent
Wantz, II et al.

(10) Patent No.: US 10,062,103 B2
(45) Date of Patent: Aug. 28, 2018

(54) NATIVE E-COMMERCE TRANSACTABLES FOR FAMILIAR USER ENVIRONMENTS

(71) Applicant: Comr.Se Corp., Seattle, WA (US)

(72) Inventors: John T. Wantz, II, Frendame, WA (US); Rhen Zabel, Monroe, WA (US); Greg Vandenberg, Snohomish, WA (US); Tim Piatenko, Mountain View, CA (US)

(73) Assignee: Kyle Schei, Seattle, WA (US)

( * ) Notice: Subject to any disclaimer, the term of this patent is extended or adjusted under 35 U.S.C. 154(b) by 0 days.

(21) Appl. No.: 14/448,457

(22) Filed: Jul. 31, 2014

(65) Prior Publication Data

US 2015/0278931 A1    Oct. 1, 2015

Related U.S. Application Data

(63) Continuation of application No. 14/231,336, filed on Mar. 31, 2014.

(51) Int. Cl.
*G06Q 30/06* (2012.01)
*G06Q 50/00* (2012.01)

(52) U.S. Cl.
CPC ......... *G06Q 30/0641* (2013.01); *G06Q 50/01* (2013.01)

(58) Field of Classification Search
CPC ............................ G06Q 30/06; G06Q 30/08
(Continued)

(56) References Cited

U.S. PATENT DOCUMENTS 5,870,724 A    2/1999 Lawlor et al.
5,974,396 A   10/1999 Anderson et al.
(Continued)

FOREIGN PATENT DOCUMENTS

EP    2507761 A1   10/2012
GB    2366882 A    3/2002
(Continued)

OTHER PUBLICATIONS

"The Fancy App Guide" Business Insider, Aug. 6, 2012, by Kevin Smith, at http://www.businessinsider.com/the-fancy-app-guide-2012-8?op=1, last accessed Oct. 22, 2014.*
(Continued)

*Primary Examiner* — Ethan D Civan
*Assistant Examiner* — Ming Shui (57) ABSTRACT

Native e-commerce transactables for social and other familiar and/or suitable user environments are enabled. A user of a network site may interact with a transactable to conduct a transaction with a $3^{rd}$ party without leaving a user environment of the network site. The transactable may be configured to adopt the "look and feel" of the network site into which it is incorporated. While conducting the transaction with the transactable, the user may perceive that they remain at the network site, even though transaction information may be exchanged with a $3^{rd}$ party network site. The transaction mediation service may obtain social activity data from a plurality of social network sites, as well as merchant activity data (e.g., transaction activity) from a plurality of merchant network sites. The data of each suitable network site may be translated, transformed and/or normalized into a unified and uniform format maintained by the transaction mediation service.

17 Claims, 9 Drawing Sheets

(58) Field of Classification Search
USPC .......................................... 705/26–27.2, 28
See application file for complete search history.

(56) References Cited

U.S. PATENT DOCUMENTS

| | | | |
|---|---|---|---|
| 6,505,168 | B1 | 1/2003 | Rothman et al. |
| 7,035,855 | B1 | 4/2006 | Kilger et al. |
| 7,478,054 | B1 | 1/2009 | Adams et al. |
| 8,095,432 | B1* | 1/2012 | Berman et al. ............ 705/26.7 |
| 8,370,269 | B2 | 2/2013 | Macdonald-korth et al. |
| 8,386,353 | B2 | 2/2013 | Hirson et al. |
| 8,494,913 | B2 | 7/2013 | Cavagnaro |
| 8,504,423 | B2 | 8/2013 | Rotbard et al. |
| 8,504,910 | B2 | 8/2013 | Tarjan |
| 2003/0041068 | A1* | 2/2003 | Camarillo ......... G06F 17/30569 |
| 2007/0112647 | A1* | 5/2007 | Borders ............ G06Q 10/0631 |
| | | | 705/7.35 |
| 2008/0228595 | A1 | 9/2008 | Hill et al. |
| 2009/0070219 | A1 | 3/2009 | D'Angelo et al. |
| 2009/0070228 | A1 | 3/2009 | Ronen |
| 2009/0182664 | A1 | 7/2009 | Trombley |
| 2009/0282002 | A1 | 11/2009 | Reeder et al. |
| 2010/0023386 | A1 | 1/2010 | Avisar et al. |
| 2010/0119053 | A1 | 5/2010 | Goeldi |
| 2011/0016014 | A1 | 1/2011 | Tonnison et al. |
| 2011/0093361 | A1 | 4/2011 | Morales |
| 2011/0137994 | A1 | 6/2011 | Kumar et al. |
| 2011/0161201 | A1* | 6/2011 | Stocker ........................ 705/27.1 |
| 2012/0030032 | A1 | 2/2012 | Zurada |
| 2012/0095881 | A1 | 4/2012 | Rothman |
| 2012/0109777 | A1 | 5/2012 | Lipsitz et al. |
| 2012/0158589 | A1 | 6/2012 | Katzin et al. |
| 2012/0166280 | A1 | 6/2012 | Lee et al. |
| 2012/0185355 | A1 | 7/2012 | Kilroy |
| 2012/0221437 | A1 | 8/2012 | Yoo |
| 2012/0303425 | A1 | 11/2012 | Katzin et al. |
| 2012/0316996 | A1 | 12/2012 | Shin et al. |
| 2013/0006788 | A1 | 1/2013 | Zhou et al. |
| 2013/0054330 | A1 | 2/2013 | O'donnell et al. |
| 2013/0073388 | A1 | 3/2013 | Heath |
| 2013/0090998 | A1 | 4/2013 | Shimogori |
| 2013/0132240 | A1 | 5/2013 | Aguilar |
| 2013/0144785 | A1 | 6/2013 | Karpenko et al. |
| 2013/0159412 | A1 | 6/2013 | Robinson et al. |
| 2013/0246138 | A1 | 9/2013 | Johnson et al. |
| 2013/0246215 | A1 | 9/2013 | Faith et al. |
| 2013/0256403 | A1 | 10/2013 | Mackinnon |
| 2013/0268331 | A1 | 10/2013 | Bitz et al. |
| 2013/0290149 | A1* | 10/2013 | Rashwan ........... G06Q 30/0641 |
| | | | 705/27.1 |
| 2013/0290203 | A1 | 10/2013 | Purves et al. |

FOREIGN PATENT DOCUMENTS

| | | |
|---|---|---|
| JP | 2001-312571 A | 11/2001 |
| JP | 2005-173780 A | 6/2005 |
| JP | 2006-252405 A | 9/2006 |
| JP | 2012-128863 A | 7/2012 |
| JP | 2012-198792 A | 10/2012 |
| KR | 10-1110617 B1 | 2/2012 |
| WO | 2009/061375 A9 | 5/2009 |
| WO | 2011/082496 A1 | 7/2011 |
| WO | 2012/116125 A1 | 8/2012 |
| WO | 2013/009660 A1 | 1/2013 |
| WO | 2013/093606 A1 | 6/2013 |

OTHER PUBLICATIONS

"Don't Just Pin It, Buy It: Pinterest Rival Fancy Figures Out Social Commerce," Feb. 23, 2012, by Sarah Perez, http://techcrunch.com/2012/02/23/dont-just-like-it-buy-it-pinterest-rival-fancy-may-have-just-figured-out-social-commerce, last accessed Oct. 23, 2014.*

U.S. Appl. No. 14/231,336, filed Mar. 31, 2014, Titled: Native E=Commerce Transactables for Familiar User Environments.

Arrington, Michael. Mobile Payments Getting Traction on Social Networks, But Fees Are Sky High. [online]. TechCrunch.com, Jan. 13, 2009 [retrieved on Oct. 24, 2013]. Retrieved from the Internet: <URL: http://techcrunch.com/2009/01/13/mobile-payments-getting-traction-on-social-networks-but-feesare-sky-high/>, 5 pages.

Bruene, Jim. PayPal Launches on Facebook: Who Wants to be the First Bank? [online]. Netbanker, Jun. 22, 2007 [retrieved on Oct. 24, 2013]. Retrieved from the Interenet: <URL: http://www.netbanker.com/2007/06paypal-launches-on-facebook-who-wants-to-be-the-firstbank-on-facebook.hml>, 2 pages.

GroupM Search. The Virtuous Circle: The Role of Search and Social Media in the Purchase Pathway. [online] GroupM Search—A WPP company, Feb. 2011 [retrieved on Oct. 24, 2013]. Retrieved from the Internet: URL:http://www.wpp.com/~/media/SharedWPP/ReadingRoom/Digital/groupm_search_the_virtuous_circle_feb11.pdf>, 10 pages.

McGuire, Seth. Social Media and Markets: The New Frontier. [online] Gnip, Inc., Oct. 24, 2013 [retrieved on Oct. 24, 2013]. Retrieved from the Internet: <URL: http://gnip.com/docs/gnip-smm-nf.pdf>, 12 pages.

Oliveira, et al. Collaborative virtual environment for industrial training and e-commerce. *IEEE VRTS* 288 (2000), 4 pages.

Puglia et al. MultECommerce: A distributed architecture for collaborative shopping on the www. *Proceedings of the 2nd ACM Conference on Electronic Commerce.* ACM (Oct. 2000), 10 pages.

Radicati, Sara. Social Media Market, 2012-2016. [online] The Radicati Group, Inc., Jun. 2012 [retrieved on Oct. 24, 2013]. Retrieved from the Internet: <URL: http://www.radicati.com/wp/wp-content/uploads/2012/05/Social-Media-Market-2012-2016-Executive-Summary.pdf>, 4 pages.

Seifert et al. MoCoShoP: Supporting Mobile and Collaborative Shopping and Planning of Interiors. *Human-Computer Interaction-INTERACT*, Springer Berlin Heidelberg (2013), pp. 756-763.

Shen et al. vCOM: Electronic commerce in a collaborative virtual world. *Electronic Commerce Research and Applications* 1.3 (2002), pp. 281-300.

Stelzner, Michael. 2013 Social Media Marketing Industry Report. [online] Social Media Examiner, May 21, 2013 [retrieved on Oct. 24, 2013]. Retrieved from the Internet: <URL: http://www.socialmediaexaminer.com/social-media-marketing-industry-report-2013/>, 2 pages.

* cited by examiner

NATIVE E-COMMERCE TRANSACTABLES FOR FAMILIAR USER ENVIRONMENTS

CROSS-REFERENCES TO RELATED APPLICATIONS

This application is a continuation of U.S. patent application Ser. No. 14/231,336, entitled "NATIVE E-COMMERCE TRANSACTABLES FOR FAMILIAR USER ENVIRONMENTS," filed Mar. 31, 2014, the contents of which are hereby incorporated in their entirety by reference.

TECHNICAL FIELD

This invention pertains generally to human-computer interaction and, more particularly, to human-computer interaction in a context of computer facilitated commerce.

BACKGROUND

It has become commonplace to access a wide variety of information and services with computer networks, some of which span the globe. Over time, the ways in which people interact with such computer networks have changed. In particular, network sites emphasizing social interaction ("social network sites") such as Facebook® and Twitter® have become popular. Although there are many different kinds of network sites offering many different kinds of media and services, a significant portion of computer network users primarily interact with a relatively small subset of network sites. The popularity of social network sites (e.g., as expressed in volume of network traffic to the site and user time spent at the site) has led to a widespread familiarity with the user interfaces and user experiences (collectively, "user environments") of the social network sites. Ease and familiarity with a particular user interface can be a significant factor in a person's willingness to interact with a given network site. For example, an unfamiliar user interface can be perceived as strange, confusing, or cumbersome. This perception can be a barrier for users, even when the offerings of the associated network site are otherwise attractive.

In particular, the reluctance of some users to engage with unfamiliar user environments can be problematic for providers of goods and services ("merchants"). Many social network sites display merchant advertisements, but clicking on an advertisement can cause the user to leave the familiar user environment of the social network site and transition to the unfamiliar user environment of the merchant's network site. The transition can be perceived as undesirable by the user, potentially negating interest generated by the advertisement.

Popular multi-merchant network sites exist, and such sites can ease the problem of unfamiliar user environments, however incorporation into such sites can be problematic for some merchants. For example, such incorporation may damage the image of an exclusive merchant brand. On the other hand, popular multi-merchant network sites have access to user transaction data with respect to a wide variety of goods and services. Access to such data can be desirable to more accurately identify users that are likely to be interested in the particular goods and services of a merchant. Advertising to uninterested users can be problematic for both user and merchant.

BRIEF DESCRIPTION OF THE DRAWINGS

Illustrative embodiments of the present invention are described in detail below reference to the following drawing figures.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In accordance with at least one embodiment of the invention, native e-commerce transactables for social and other familiar and/or suitable user environments are enabled. A user of a network site (e.g., a "web" site based on hypertext) may interact with a transactable to conduct a transaction (e.g., a purchase of goods or services) with a $3^{rd}$ party (e.g., a merchant) without leaving a user environment of the network site. In particular, the network site ("the familiar network site") may be a social network site and the user environment may be the user environment of the social network site ("social network environment"). The transactable may include a user interface component ("interactive unit") provided by a transaction mediation service and incorporated into the user environment of the network site. The transactable may be configured to adopt the "look and feel" of the network site into which it is incorporated. For example, the transactable may incorporate same and similar graphic design elements, as well as same and similar user interface behaviors and/or idioms. While conducting the transaction with the transactable, the user may perceive that they remain at the network site, even though transaction information may be exchanged with a $3^{rd}$ party network site.

In accordance with at least one embodiment of the invention, the transaction mediation service may obtain social activity data from a plurality of social network sites, as well as merchant activity data (e.g., transaction activity) from a plurality of merchant network sites. The data of each suitable network site may be translated, transformed and/or normalized (collectively, "translated") into a unified and uniform format maintained by the transaction mediation service. For example, the collected data may be analyzed to determine goods and services (collectively, "items") of interest to particular users, to identify influential social network site users including social network site users who are influential with respect to particular merchant brands, and to identify social network users of interest to particular merchants. In accordance with at least one embodiment of the invention, transactables may be configured to implement a contextual storefront enabling purchase of the identified items from a merchant by a user while remaining in a context of the familiar network site. The contextual storefront may be customized for the user, for example, to further enhance the user's feeling of familiarity and/or to raise the probability of a completed transaction by the user.

Figure 1:
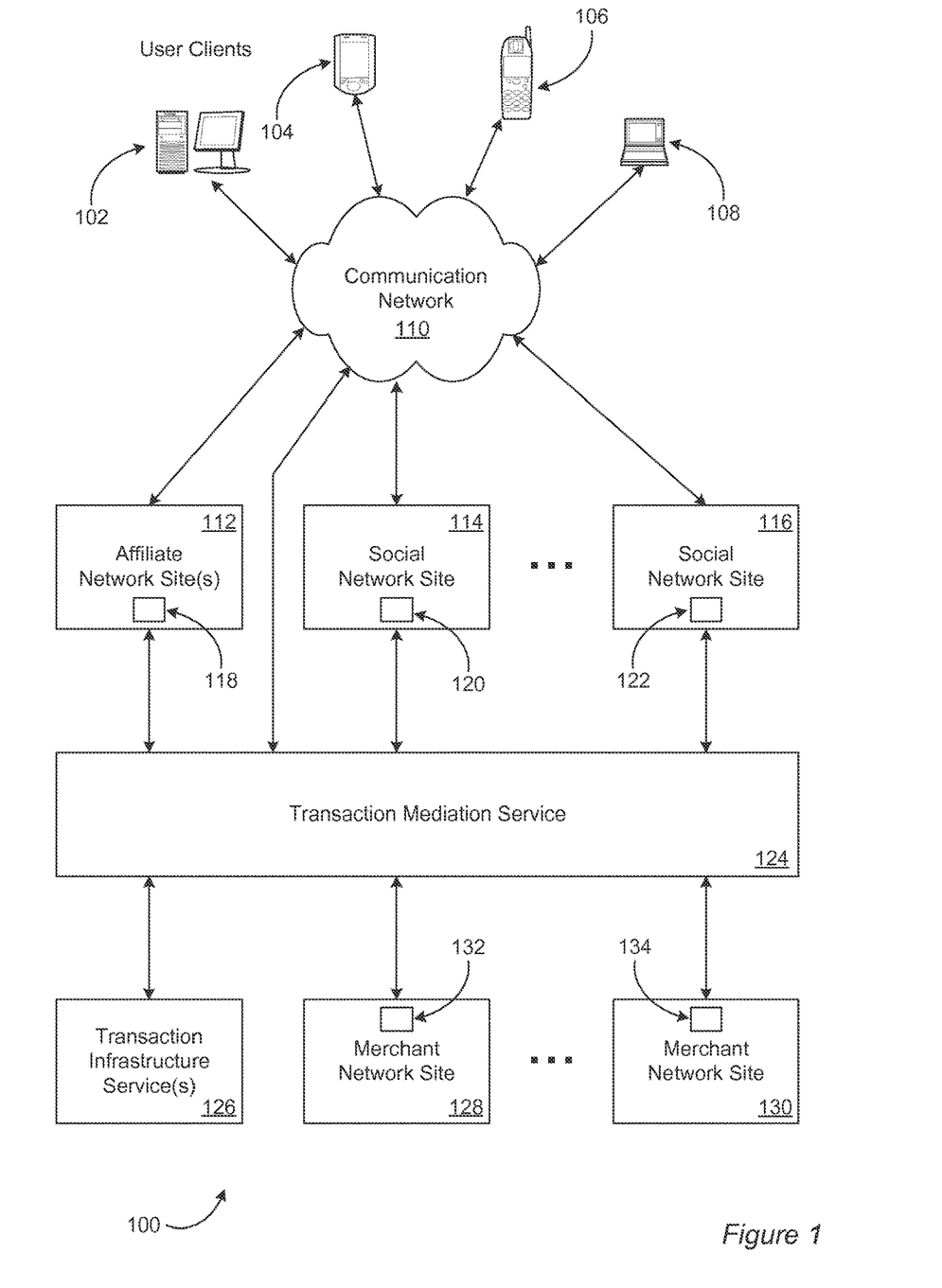
FIG. 1 is a schematic diagram depicting aspects of an example computing environment in accordance with at least one embodiment of the invention.

Having introduced some salient concepts, the description now turns to the figures. FIG. 1 depicts aspects of an example computing environment 100 in accordance with at least one embodiment of the invention. In the example computing environment 100, a wide variety of user clients 102, 104, 106, 108 may be utilized to interact with social network sites 114, 116 or any suitable network site through a communication network 110. The user clients 102, 104, 106, 108 may include desktop computers, laptop computers, table computers, smart phones, and any suitable computing device. The user clients 102, 104, 106, 108 may include one or more application programs or "apps" such as web browsers configured to enable users of the clients 102, 104, 106, 108 to interact with the social network sites 114, 116. At times, as used herein, the term "client" may refer to the enabling application program as well as, or instead of the hardware device 102, 104, 106, 108. The communication network 110 may include wired and wireless data communication networks and any suitable communication network device. The social network sites 114, 116 may enable users of the clients 102, 104, 106, 108 to interact in a social manner including, for example, sharing messages and content (e.g., "posting," "tweeting") and subscribing to the content sharing of other social network site 114, 116 users (e.g., "friending," "following"). Such subscriptions between users may define, at least in part, one or more social network graphs (or simply "social networks") reflecting the relationships between users. As is conventional, the ellipsis between the social network site 114 and the social network site 116 indicates that the environment 100 may include any suitable number of such sites. The ellipsis is used similarly throughout the drawings.

A transaction mediation service 124 may obtain item catalog data and merchant activity data (e.g., transaction activity data) with respect to users from merchant network sites 128, 130 and translate the data into a uniform format. The transaction mediation service 124 may also obtain social activity data from the social network sites 114, 116 and suitable affiliate network sites 112 and translate the data into a uniform format. The transaction mediation service 124 may interact with the network sites 112, 114, 116, 128, 130 utilizing remotely installed modules 118, 120, 122, 132, 134, respectively. Alternatively, or in addition, the network sites 112, 114, 116, 128, 130 may provide programmatic interfaces (e.g., application programming interfaces or APIs, web service interfaces) and the transaction mediation service 124 may maintain corresponding modules locally (e.g., local to the transaction mediation service 124 with respect to the network 110). the merchant network sites 128, 130 may be maintained by merchant to conduct transactions (e.g., purchase transactions) with respect to any suitable item or set of items. Suitable transactions include querying and/or searching for information, purchasing, ordering, subscribing, renewing, consuming, viewing, listening to, playing, shipping, tracking and returning items.

The transaction mediation service 124 may also interact with one or more transaction infrastructure services 126 including payment services, banks, and credit worthiness services. The transaction mediation service 124 may perform all suitable functions with respect to payment processing, freeing the social network sites 114, 116 and/or the merchant network sites 128, 130 from this responsibility. The user clients 102, 104, 106, 108 may interact directly with the transaction mediation service, although such interaction need not be apparent to users of the clients 102, 104, 106, 108. Although not depicted in FIG. 1 for reasons of clarity, the user clients 102, 104, 106, 108 may also interact directly with the merchant network sites 128, 130 and/or the transaction infrastructure service(s) 126.

Figure 2:
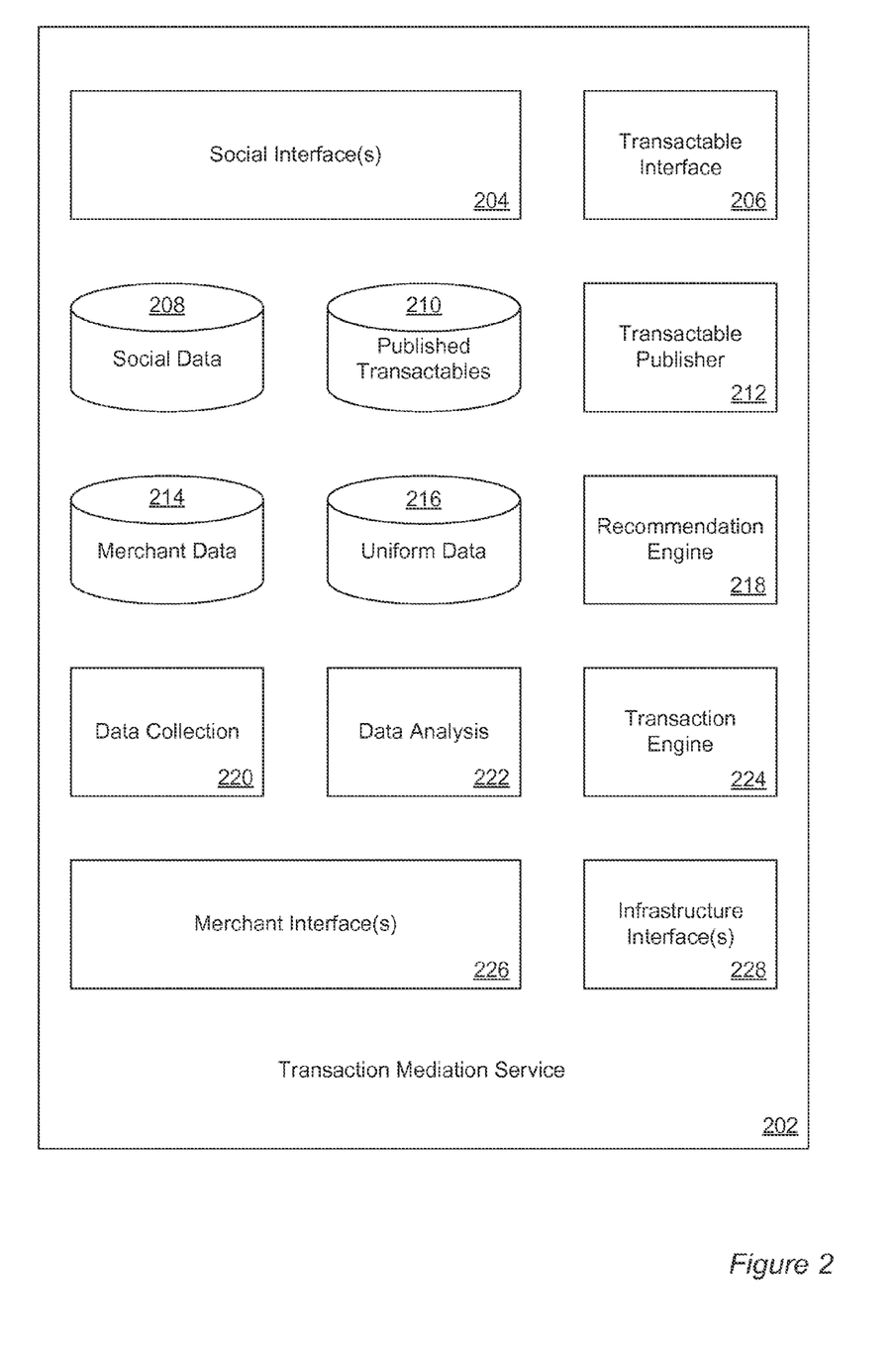
FIG. 2 is a schematic diagram depicting aspects of an example transaction mediation service in accordance with at least one embodiment of the invention.

FIG. 2 depicts aspects of an example transaction mediation service 202 in accordance with at least one embodiment of the invention. The transaction mediation service 202 depicted in FIG. 2 is an example of the transaction mediation service 124 of FIG. 1. The transaction mediation service 202 may include one or more merchant interfaces 226 configured at least to enable the transaction mediation service 202 to interact with the merchant network sites 128, 130 (FIG. 1) and/or the remote transaction mediation service modules 132, 134 installed at the merchant network sites 128, 130. For example, the merchant interface(s) 226 may enable the transaction mediation service 202 to obtain item catalog information and user merchant activity information, as well as to cause and monitor progression of transaction processes at merchant network sites 128, 130.

The transaction mediation service 202 may include one or more social interfaces 204 configured at least to enable the transaction mediation service 202 to interact with the social network sites 114, 116 (FIG. 1) and/or the remote transaction mediation service modules 120, 122 installed at the social network sites 114, 116. For example, the social interface(s) 204 may enable the transaction mediation service 202 to obtain social activity information from the social network sites 114, 116 as authorized by users.

The transaction mediation service 202 may include a data collection module 220 configured at least to interact with the merchant interface(s) 226 and the social interface(s) 204 to utilize the merchant interface(s) 226 and the social interface (s) 204 to obtain the data, as well as to continually update and maintain the data. Data obtained from merchant network sites 128, 130 (FIG. 1) may be stored in a merchant data store 214. Data obtained from social network sites 114, 116 may be stored in a social data store 208. Alternatively, or in addition, the data obtained from merchant network sites 128, 130 and/or social network sites 114, 116 may be translated from different formats into a uniform format suitable for cross-site comparison and stored in a uniform data store 216.

A data analysis module 222 may be configured at least to analyze the data in the merchant data store 214, the social data store 208 and/or the uniform data store 216. For example, data collection module 220 may maintain a uniform cross-merchant item catalog in the unified data store 216 may and the data analysis module 222 may determine various scores and rankings with respect to the uniform cross-merchant item catalog including item popularity with respect to user activity events such as views and completed transactions. The data analysis module 222 may aggregate and/or score user activity on a per item basis including, for example, various popularity scores and rankings. In addition, the data analysis module 222 may aggregate and/or score activity with respect to items in the uniform cross-merchant catalog on a per user basis. Scores may be weighted with respect to importance, for example, based on time (e.g., with respect to activity recency). Scores may also be calculated with respect to demographic and/or psychographic user groups, as well as product categories.

In addition, social network graphs in which a user participates may be analyzed to define user groups and determine user group and/or user brand affinities, as well as influential users ("influencers") in social networks. For example, influencers may be identified based on one or more of: number of social network subscriptions by other users (e.g., number of friends or followers), frequency of content generation (e.g., frequency of posting or tweeting), number of votes by other social network users (e.g., "likes"), number of content duplications by other users (e.g., "shares," "retweets"), number of associated responses (e.g., associated posts, comments, tweets), as well as weighted combinations and statistical transformations thereof. Identified influencer affinities may be given greater weighting when determining scores for social network graphs that include the influencer. Identified correlations between user social network activity (e.g., posts about an item) and user merchant activity (e.g., purchase transaction with respect to the item) may enhance associated weightings. The unified data store 216 may be updated with results generated by the data analysis module 222. In accordance with at least one embodiment of the invention, the ranking and/or scoring generated by the data analysis module 222 may be utilized by merchants to determine which of their product and/or service offerings is, or is likely to be, most successful in marketplaces associated with users, and to adjust their marketing campaigns accordingly.

The rankings and scores determined by the data analysis module 222 may be utilized by a recommendation engine 218 to determine a ranked set of items to present to a user or group of users. The ranking may be with respect to any suitable criteria including items mostly likely to be of interest the user(s), items most likely to be purchased by the user(s), and items likely to generate most revenue and/or profit. Such rankings can be surprising to merchants, particularly with respect to user groups in demographics that are unfamiliar to the merchants. Alternatively, or in addition, such recommendations may be utilized by merchants to "fine tune" marketing campaigns. Identified influencers and/or influential social networks segments can be targeted to act as organic product promoters, for example, to "seed" a marketing campaign. Alternatively, or in addition, such influencers and/or segments may be directly engaged and motivated to promote one or more merchant brands. In accordance with at least one embodiment of the invention, such techniques can significantly reduce marketing campaign cost relative to conventional approaches.

Such ranked sets of items may be presented to merchants, and merchants may select one or more of the items to be presented to social network users with transactables. Alternatively, or in addition, the transaction mediation service 202 may be configured to automatically select one or more of the items to present in accordance with one or more campaign criteria such as presentation frequency, campaign cost, campaign revenue and campaign profitability. A transactable publisher 212 may configure transactables associated with selected items and publish the transactables to associated user social feeds (e.g., streams of new content presented to social network users), for example, with the social interface(s) 204. Published transactables, including active and historical transactables, may be recorded in a published transactables data store 210.

Once published in a user's social feed, as described in more detail below with reference to FIG. 3 and FIG. 4, the user may interact with the transactable to conduct a transaction (e.g., a purchase transaction) with respect to the configured item or set of items. For example, the published transactable may incorporate executable code configured to be responsive to user interaction and to relay user indications and/or transaction data to a transactable interface 206 of the transaction mediation service 202. Alternatively, or in addition, an interactive unit of the transactable may be maintained by the transactable interface 206.

The transaction mediation service 202 may include a transaction engine 224 configured to facilitate transactions with merchant network sites 128, 130 (FIG. 1). As described below in more detail with reference to FIG. 5, the transaction engine 224 may support a uniform transaction process (e.g., a uniform purchase transaction process), for example, as experienced by a user interacting with a published transactable, at least in part by transforming, mapping, synchronizing, correlating and/or translating (collectively, "translating") the uniform transaction process to one or more merchant-specific transaction processes. The transaction engine 224 may access various transaction infrastructure services 126 utilizing one or more infrastructure interfaces 228. The uniform data store 216 may be updated with respect to transaction activity facilitated by the transaction engine 224.

Figure 3:
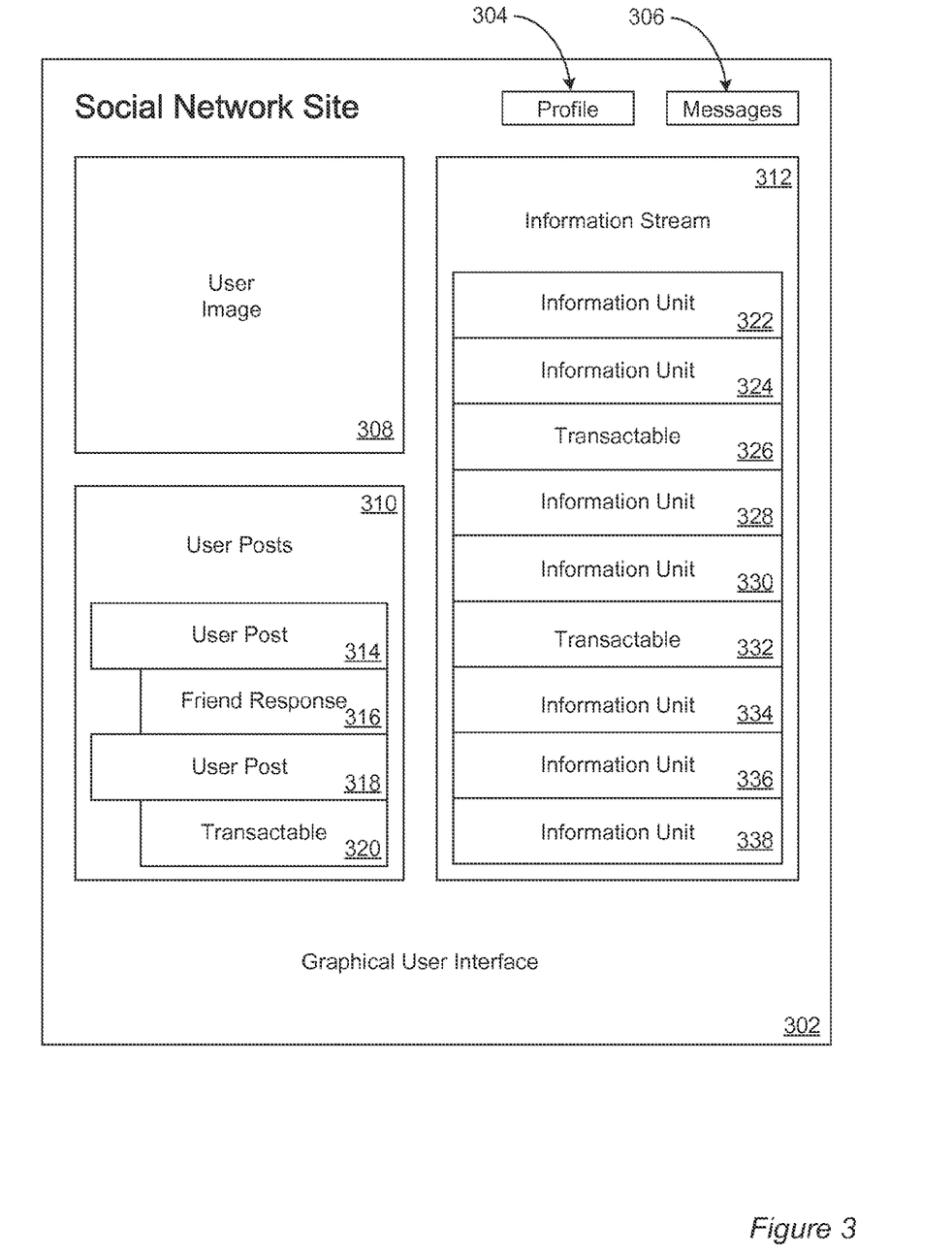
FIG. 3 is a schematic diagram depicting aspects of an example social network site graphical user interface (GUI) in accordance with at least one embodiment of the invention.

FIG. 3 depicts aspects of an example social network site graphical user interface (GUI) 302 in accordance with at least one embodiment of the invention. For example, the GUI 302 may be a web-based GUI of the social network site 114 (FIG. 1). The example GUI 302 includes an image 308 of a user (e.g., captured with a digital camera), an interactive button 304 to access and/or edit the user's profile (e.g., personal data and self-characterizations of various kinds by the user), an interactive button 306 to access private messages sent to the user, a stream of user posts 310 (e.g., multimedia content generated by the user) and an information stream 312. For example, the information stream 312 may include multimedia content generated by other users in the user's social network at the social network site 114, as well as information provided by partners and affiliates of the social network site 114. The user's profile 304 may include data suitable for facilitating a transaction such as name, shipping address, billing address, and payment instrument details (e.g., credit card details).

As depicted in FIG. 3, the user posts 310 portion of the GUI 302 may include one or more posts 314, 318 by the user, and one or more responses to each post. For example, a first user post 314 may have a response 316 posted by a friend in the user's social network. A second user post 318 may have a response 320 that is a transactable published by the transaction mediation service 202 (FIG. 2). For example, the user may be a fan of a particular merchant, the content of user post 318 may reference the merchant, a brand of the merchant and/or an item sold by the merchant, and the transactable 320 published in response may be configured to enable a purchase transaction with respect to an item recommended by the recommendation engine 224 taking into account the user post 318. Depending on configured campaigns, the transactable 320 may be configured to offer, for example, a discount with respect to a mentioned item, another item by a mentioned merchant, or a different item by a competing merchant.

The information stream 312 may include a stream of information units 322, 324, 326, 328, 330, 332, 334, 336, 338 including any suitable content such as content generated by other users in the user's social network, content generated by the social network site 114 (FIG. 1), news, and content provided by partners and affiliates of the social network site 114. Some of the stream of information units 326, 332 may be transactables published by the transaction mediation service 202 (FIG. 2). For example, the transactables 326, 332 may relate to other information units 322, 324, 326, 328, 330, 332, 334, 336, 338 in the information stream 312. Alternatively, or in addition, the transactables 326, 332 may be generated as part of a merchant campaign in accordance with recommendations provided by the recommendation engine 218.

Figure 4:
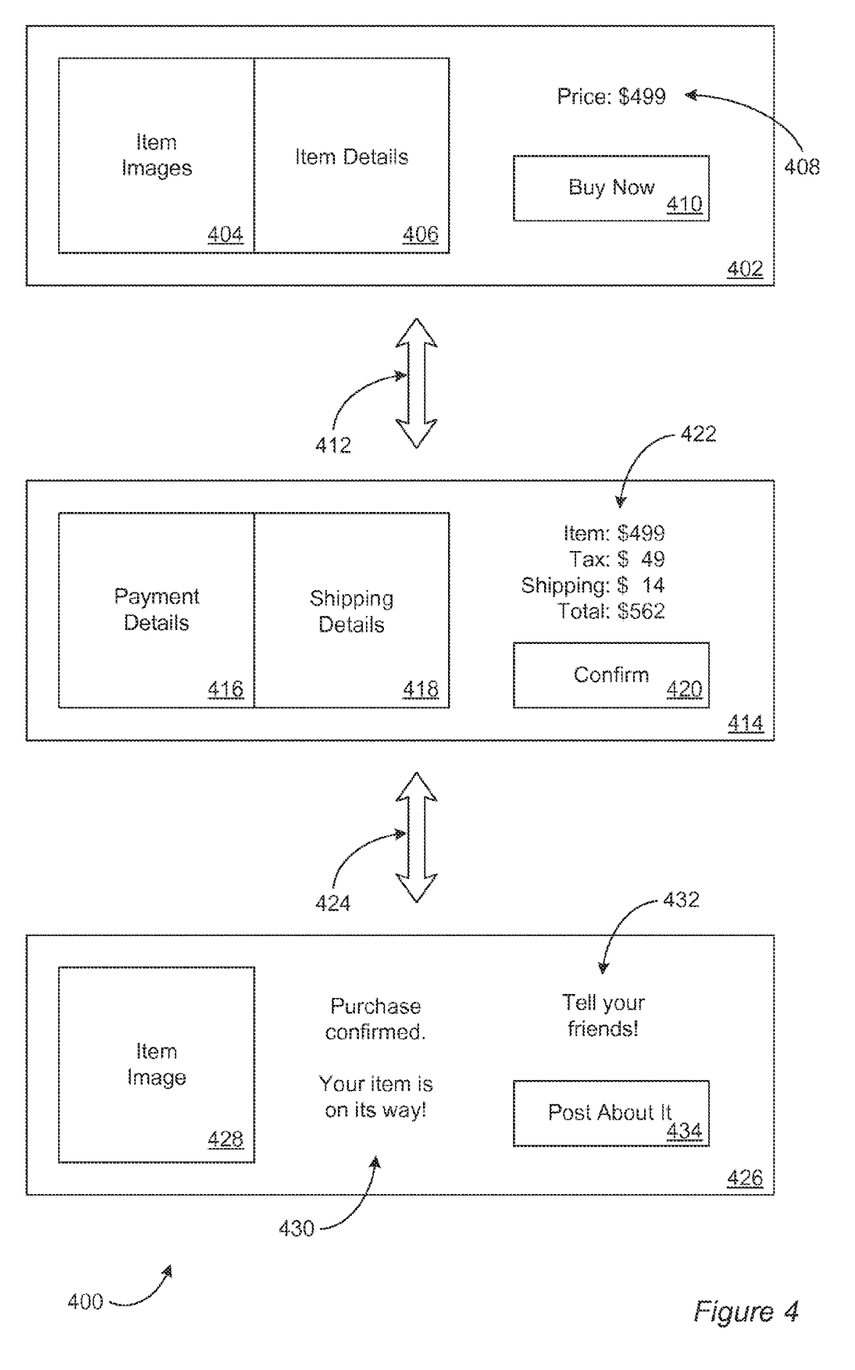
FIG. 4 is a user interface storyboard depicting aspects of an example transactable graphical user interface (GUI) in accordance with at least one embodiment of the invention.

FIG. 4 depicts aspects of an example transactable 400 graphical user interface (GUI) in accordance with at least one embodiment of the invention. The transactable GUI 402 may correspond to an initial appearance of the transactable 320, 326, 332 (FIG. 3) as it appears in a user's posts 310 and/or information stream 312. Alternatively, the transactable GUI 402 may be presented to the user responsive to an initial interaction. The transactable GUI 402 may initially include one or more images 404 of an item or set of items (e.g., in accordance with recommendations provided by the recommendation engine 218 of FIG. 2), as well as item details 406 such as the item's name and a text-based description of the item, an item price 408 and a "buy now" button 410.

Interacting with the "buy now" button 410 may transition 412 the transactable GUI 402 to display 414. The GUI display 414 may include a region for entering and/or confirming payment details 416, shipping details 418, and a total financial amount 422 (e.g., including tax and shipping) associated with a purchase transaction with respect to the item. In accordance with at least one embodiment of the invention, transaction data corresponding to one or more portions of the payment details 416 and/or the shipping details 418 may be obtained by the published transactable and/or the transactable interface 206 (FIG. 2) from the social network site 114 (FIG. 1), for example, utilizing the social interface(s) 204.

Interacting with a "confirm" button 420 of the GUI display 414 may commit the user to the transaction and transition 424 the GUI display 414 to another GUI display 426. The GUI display 426 may include an image 428 of the purchased item, a congratulatory message 430, an encouragement 432 and/or incentive to post about the purchase, and a button 434 that facilitates posting about the purchase, for example, at least in part by automatically generating a suitable content for posting by the user. Of course, this 400 is just one example, any many different transactable GUIs are possible. In particular, transactable GUIs may be customized for each user to provide a customized storefront and/or purchasing experience.

A transaction, such as a purchase transaction, may involve the transaction mediation service 202 (FIG. 2) interacting with one or more merchant network sites 128, 130 (FIG. 1) with differing transaction processes. In accordance with at least one embodiment of the invention, the transactable 400 may provide a uniform and/or familiar transaction experience independent of transaction experiences of involved merchant network sites 128, 130. For example, the transaction engine 224 may coordinate and/or manage a mapping between the uniform transaction experience of the transactable 400 and the different and/or unfamiliar transaction experiences of the involved merchant network sites 128, 130. The transaction engine 224 may coordinate such a mapping at least in part by establishing and maintaining corresponding transaction contexts corresponding to the transaction mediation service 124 and the involved merchant network sites 128, 130.

Figure 5:
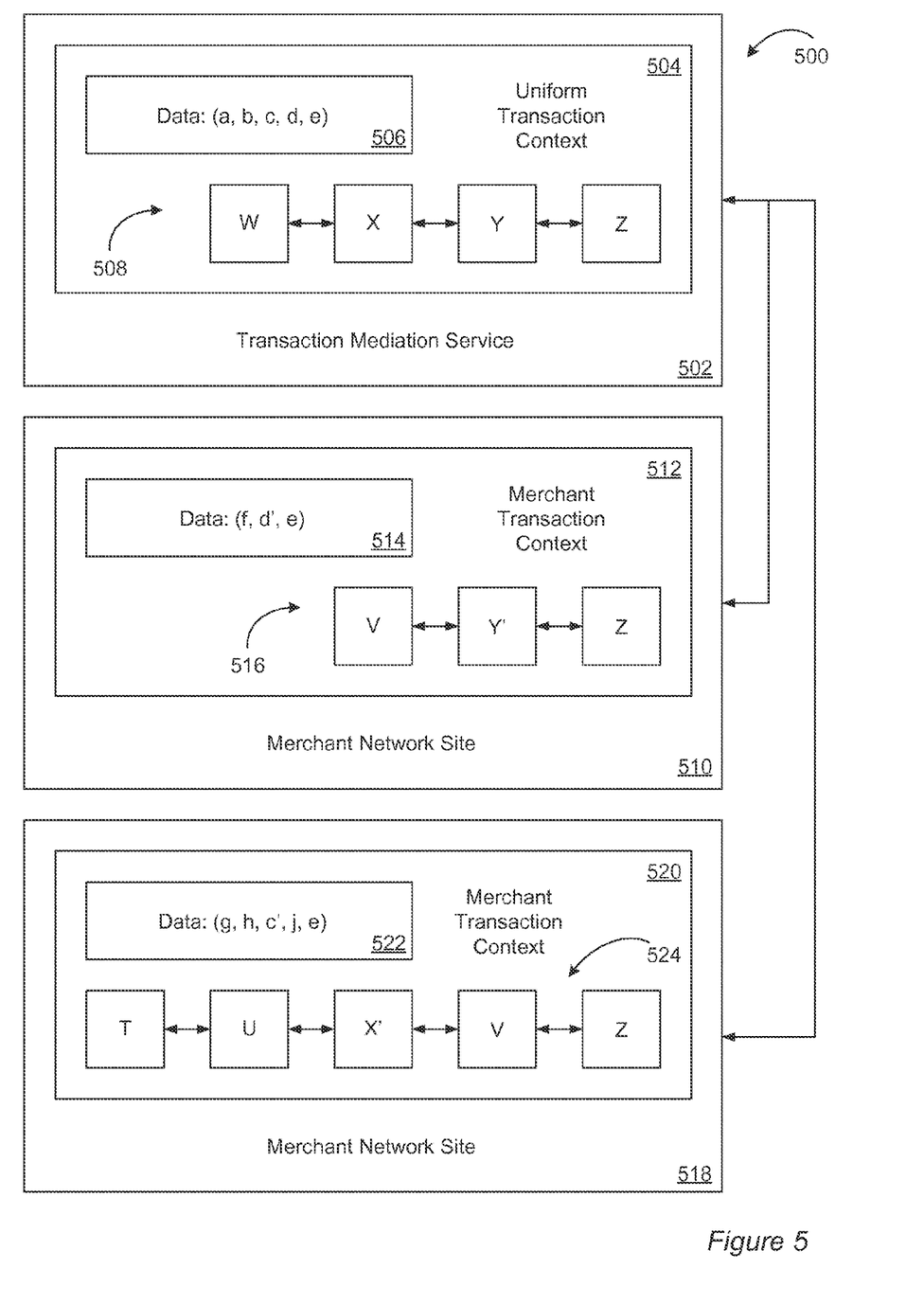
FIG. 5 is a schematic diagram depicting aspects of an example uniform transaction context mapping in accordance with at least one embodiment of the invention.

FIG. 5 depicts aspects of an example uniform transaction context mapping 500 in accordance with at least one embodiment of the invention. A uniform transaction context 504 is established at the transaction mediation service 502, for example, corresponding to a purchase transaction initiated responsive to user interaction with the transactable 400 (FIG. 4). The uniform transaction context 504 has a uniform transaction process 508 with four steps, stages, phases and/or states (collectively, "steps") W, X, Y, Z, and uniform transaction data 506 with five items (a, b, c, d, e). In contrast, a first involved merchant network site 510 has a merchant-specific transaction context 512 with a three step V, Y', Z merchant-specific transaction process 516 and merchant-specific transaction data 514 with three items (f d', e), and a second involved merchant network site 518 has a merchant-specific transaction context 520 with a five step T, U, X', V, Z merchant-specific transaction process 524 and merchant-specific transaction data 522 with five items (g, h, c', j, e).

In this example 500, the transaction processes 508, 516, 524 of each context 504, 512, 520 differ while including at least one common step (i.e., step Z). Similarly, the transaction data 506, 514, 522 of each context 504, 512, 520 differ while including at least one common item (i.e., item e). In addition, the transaction processes 508, 516, 524 and data 506, 514, 522 differ with respect to number and type of steps and data items. The transaction engine 224 (FIG. 2) may be configured with a mapping to and from the uniform transaction context 504 to each merchant transaction context 512, 520, including a mapping between process steps and data items. For example, the transaction data 514 of the merchant transaction context 512 may include items (e.g., item e) that are a direct mapping of items (e.g., item e) in the uniform transaction context 504, items (e.g., item d') that are a transform of items (e.g., item d) in the uniform transaction context 504, as well as items (e.g., item f) that are a transform of multiple items (e.g., a, b and/or c) in the uniform transaction context 504 and/or of items not present in the uniform transaction context 504 (e.g., a constant value and/or authentication credentials stored by the transaction mediation service 502).

The different transaction processes 508, 516, 524 may be coordinated with respect to sequence. For example, it may be that steps W and X of the uniform transaction process 508 must be completed before the merchant-specific transaction process 516 can transition from step V to Y'. Conversely, it may be that step Y' of the merchant-specific transaction process 516 must be complete before the uniform transaction process 508 can transition from step Y to step Z. As depicted in FIG. 5, the different transaction contexts 502, 510, 518 may be maintained at different network sites, and the transaction engine 224 (FIG. 2) may coordinate transaction process progress at least in part with process synchronization messages exchanged with remote transaction mediation service modules 132, 134 (FIG. 1).

Figure 6:
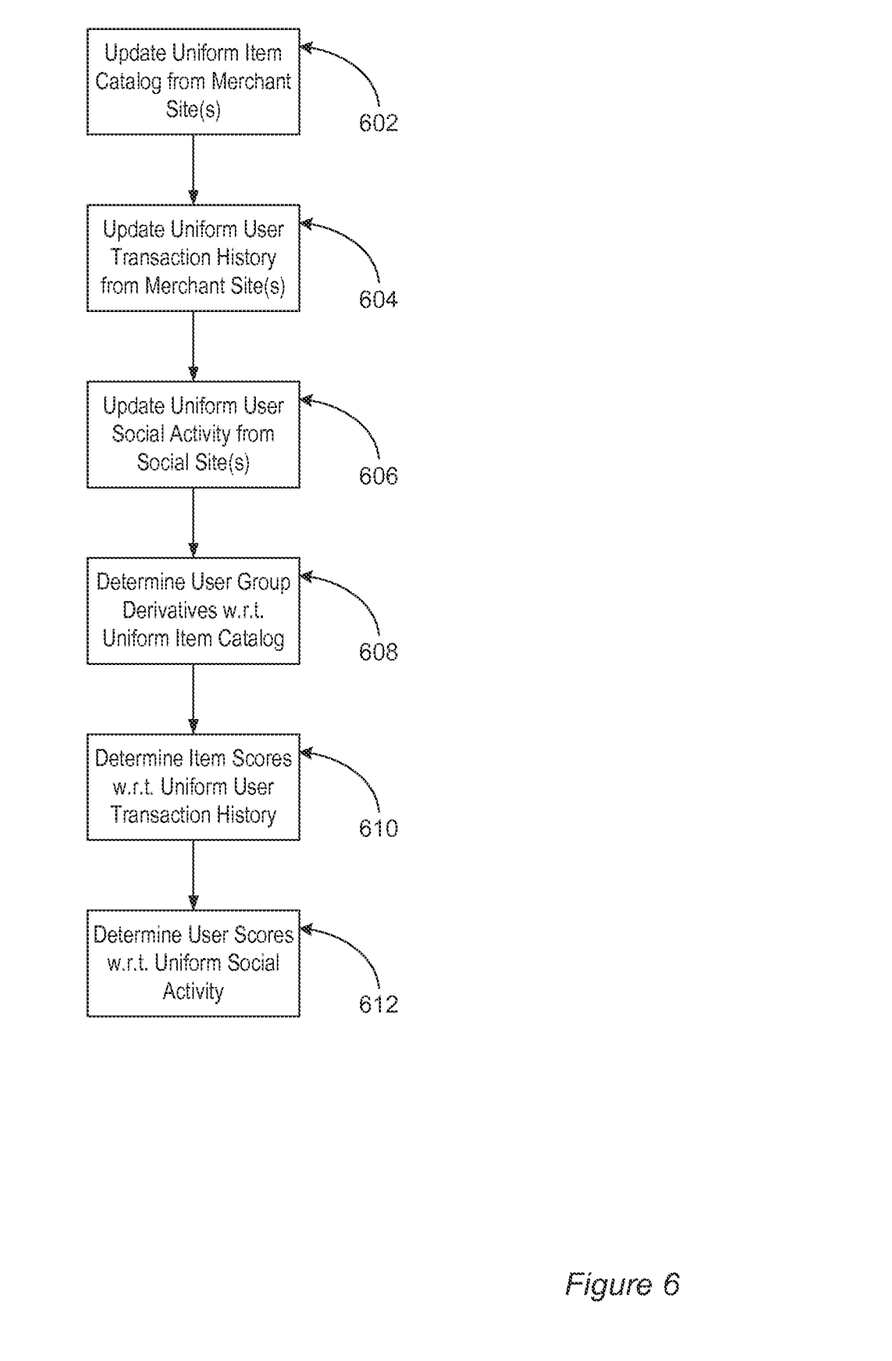
FIG. 6 is a flowchart depicting example steps for data unification in accordance with at least one embodiment of the invention.

Having described suitable systems and components, the description now turns to procedures that may be performed by the systems and/or components. FIG. 6 depicts example steps for data unification in accordance with at least one embodiment of the invention. At step 602, a uniform item catalog may be updated from one or more merchant sites. For example, the data collection module 220 (FIG. 2) may obtain item catalog data from multiple merchant network sites 128, 130 (FIG. 1) and update the unified data store 216 with item catalog data translated into a uniform format.

At step 604, uniform user transaction history may be updated from the one or more merchant sites. For example, the data collection module 220 (FIG. 2) may obtain user transaction history data from multiple merchant network sites 128, 130 (FIG. 1) and update the unified data store 216 with user transaction history data translated into a uniform format. At step 606, uniform user social activity data may be updated from one or more social network sites. For example, the data collection module 220 may obtain user social activity data from multiple social network sites 114, 116 and update the unified data store 216 with user social activity data translated into a uniform format.

At step 608, one or more user group derivatives maybe determined with respect to the uniform item catalog. For example, the data analysis module 222 (FIG. 2) may analyze the data updated at steps 602, 604 and/or 606 to obtain scores and/or rankings of items in the uniform item catalog with respect to all known users of the social network sites 120, 122 (FIG. 1) and/or particular subsets thereof, including user groups defined by demographics, evidenced brand affinity and social network relationships. At step 610, one or more item scores may be determined with respect to uniform user transaction history. For example, the data analysis module 222 may analyze the data updated at steps 602, 604 and/or 606 to obtain scores and/or rankings of items in the uniform item catalog with respect to the updated uniform user transaction history. At step 612, one or more user scores may be determined with respect to uniform social activity. For example, the data analysis module 222 may analyze the data updated at steps 602, 604 and/or 606 to obtain scores and/or rankings of users and/or sets of users with respect to the updated uniform social activity, including influencer scores and/or rankings.

Figure 7:
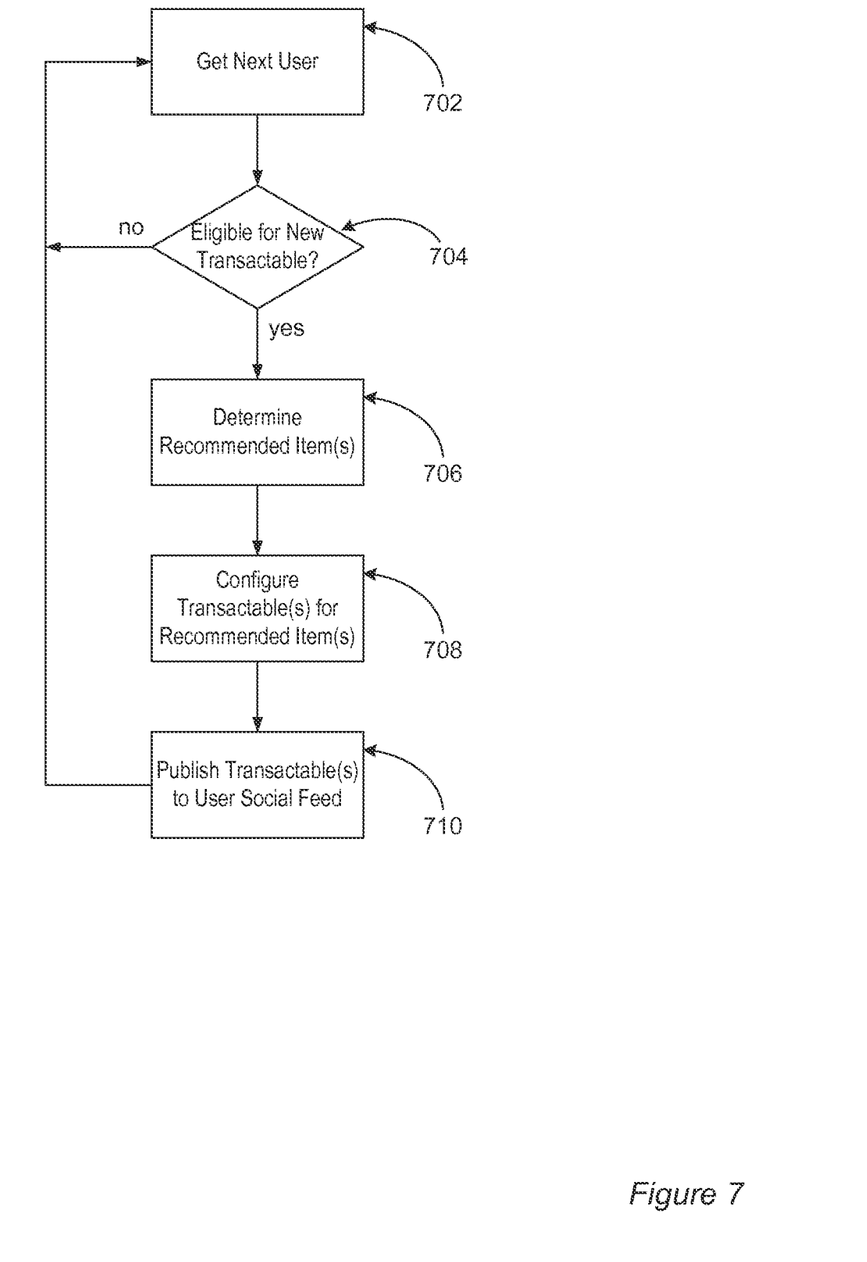
FIG. 7 is a flowchart depicting example steps for providing transactables to users in accordance with at least one embodiment of the invention.

FIG. 7 depicts example steps for providing transactables to users in accordance with at least one embodiment of the invention. At step 702, a next (e.g., a first) user may be selected, for example, by the transaction publisher 212 (FIG. 2). At step 704, it may be determined whether the selected user is eligible to receive a new transactable, for example, in accordance with an active marketing campaign. In particular, such campaigns may specify' a maximum number of transactables receivable by each user within a specified time period. If the selected user is eligible, a procedure incorporating step 704 may progress to step 706. Otherwise, the procedure may progress to step 702 to select a new user.

At step 706, one or more recommended items for the selected user may be determined, for example, by the recommendation engine 218 (FIG. 2). At step 708, corresponding transactables may be configured corresponding to the recommended items determined at step 706, for example, by the transactable publisher 212. At step 710, the configured transactables may be published to the user's feed(s) at one or more social network sites. For example, the transactable publisher 212 may publish the configured transactables with the social interface(s) 204.

Figure 8:
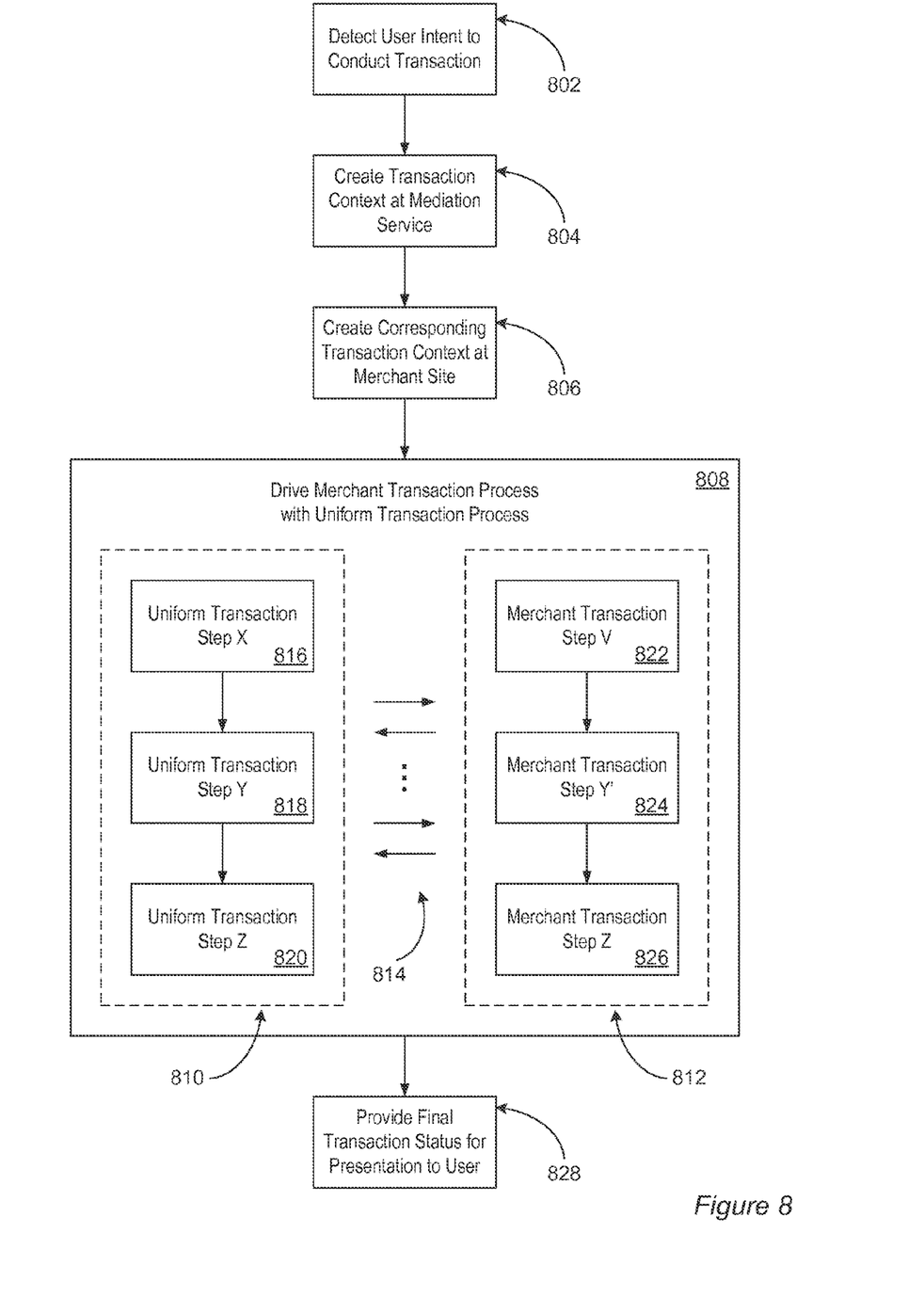
FIG. 8 is a flowchart depicting example steps for conducting a transaction in accordance with at least one embodiment of the invention.

FIG. 8 depicts example steps for conducting a transaction in accordance with at least one embodiment of the invention. At step 802, a user intent to conduct a transaction may be detected, for example, responsive to user interaction with transactable 320 (FIG. 3). At step 804, a corresponding uniform transaction context may be created at the transaction mediation service 202 (FIG. 2), for example, by the transaction engine 224. At step 806, a corresponding merchant-specific transaction context may be created at the corresponding merchant network site 128 (FIG. 1), for example, the remote transaction mediation service module 132 may create the merchant-specific transaction context responsive to instructions transmitted by the transaction engine 224.

At step 808, the transaction may be conducted at least in part by driving a merchant-specific transaction process 812 with a uniform transaction process 810. For example, as describe above with reference to FIG. 5, the steps 816, 818, 820, 822, 824, 826 of the different transaction processes may be coordinated with synchronization messages 814 sent between the transaction engine 224 (FIG. 2) and the remote transaction mediation service module 132 (FIG. 1) at the merchant network site 128. At step 828, a final transaction status may be provided for presentation to the user, for example, the "purchase confirmed" status 430 depicted in FIG. 4.

Figure 9:
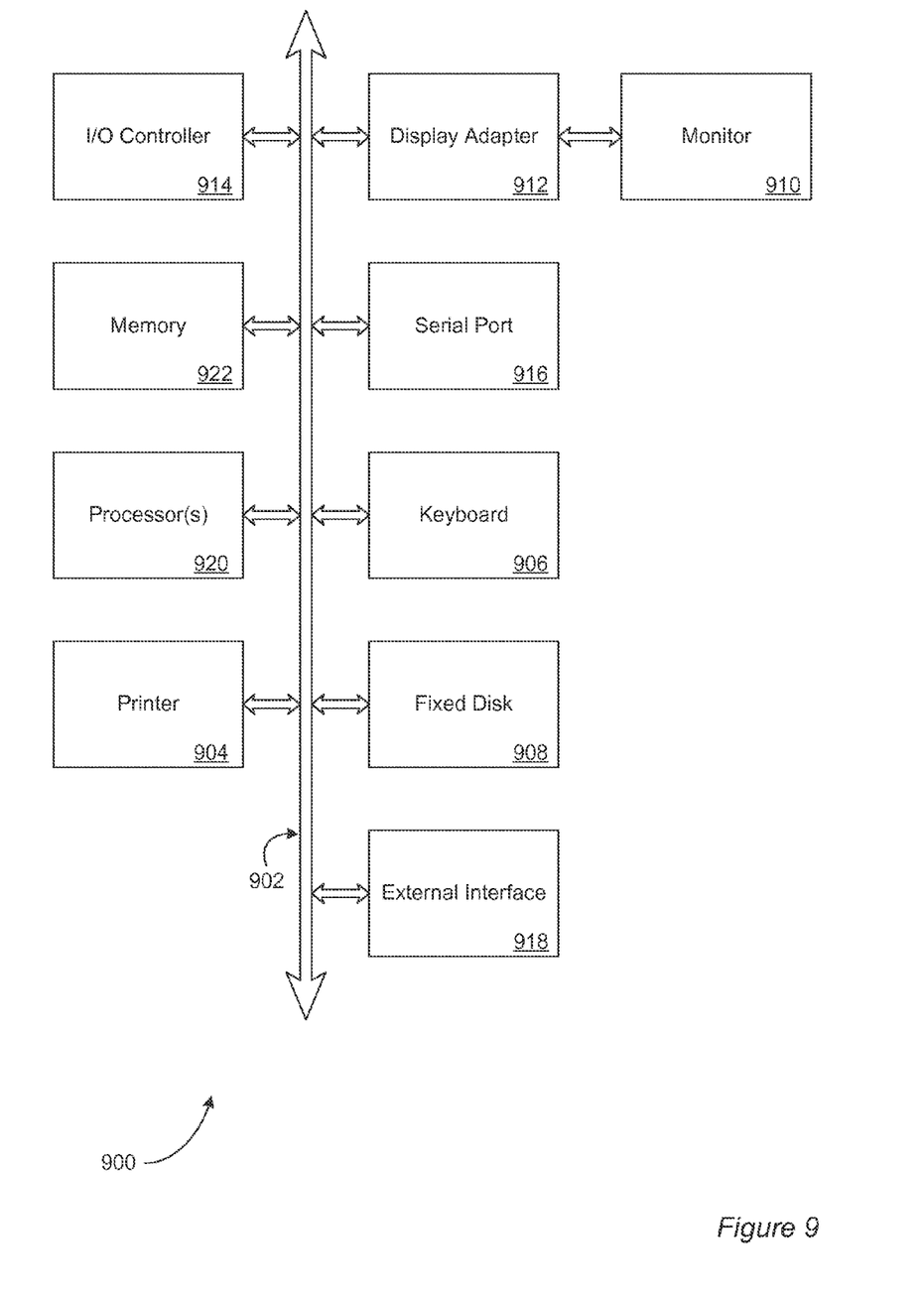
FIG. 9 is a schematic diagram depicting aspects of an example computing device in accordance with at least one embodiment of the invention.

In accordance with at least one embodiment of the invention, the system, apparatus, methods, processes and/or operations described above may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 9 depicts aspects of elements that may be present in a computing device and/or system 900 configured to implement a method and/or process in accordance with some embodiments of the present invention. The subsystems shown in FIG. 9 are interconnected via a system bus 902. Additional subsystems include a printer 904, a keyboard 906, a fixed disk 908, and a monitor 910, which is coupled to a display adapter 912. Peripherals and input/output (I/O) devices, which couple to an I/O controller 914, can be connected to the computer system with any number of means known in the art, such as a serial port 916. For example, the serial port 916 or an external interface 918 can be utilized to connect the computing device 900 to further devices and/or systems not shown in FIG. 9 including a wide area network such as the Internet, a mouse input device, and/or a scanner. The interconnection via the system bus 902 allows one or more processors 920 to communicate with each subsystem and to control the execution of instructions that may be stored in a system memory 922 and/or the fixed disk 908, as well as the exchange of information between subsystems. The system memory 922 and/or the fixed disk 908 may embody a tangible, non-transitory computer-readable medium.

Example embodiments in accordance with the invention include the following.

Example 1, a computer-readable medium having thereon computer-executable instructions that, when executed by a computer system, cause the computer system to, at least: configure an interactive unit at least to facilitate a transaction with respect to an item; enable user access to the interactive unit at a social network site such that user interaction with the interactive unit is perceived by a user as occurring at the social network site; and conduct the transaction with respect to the item based at least in part on information received from the interactive unit responsive to user interaction with the interactive unit.

Example 2, a computer-readable medium in accordance with example 1, wherein the interactive unit is further configured to share at least one common graphical user interface appearance and behavior with respect to the social network site and to act as a remote transaction venue for the item with respect to a home transaction venue for the item maintained by a merchant network site.

Example 3, a computer-readable medium in accordance with examples 1-2, wherein the interactive unit is further configured to customize a transaction experience with respect to the item based at least in part on one or more characteristics of the user, the one or more characteristics of the user being determined, at least in part, by information obtained from the social network site.

Example 4, a computer-readable medium in accordance with examples 1-3, wherein the item is selected for the interactive unit based at least in part on previous transactions conducted in response to user interaction with previously configured interactive units.

Example 5, a computer-readable medium in accordance with examples 1-4, wherein the item is selected for the interactive unit based at least in part on a brand affinity rating of the user with respect to a brand associated with the item, the brand affinity rating of the user being based at least in part on activity of the user with respect to the social network site that is associated with the brand.

Example 6, a computer-readable medium in accordance with examples 1-5, wherein the user is selected to have access to the interactive unit based at least in part on an influencer rating of the user with respect to a set of other users of the social network site with which the user has a relationship.

An references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without clear indication to the contrary.

As used herein, the term "alternatively" refers to selection of one of two or more alternatives, and is not intended to limit the selection to only those listed alternatives or to only one of the listed alternatives at a time, unless the context clearly indicates otherwise. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A method for facilitating a transaction, comprising:
obtaining, by a mediation component implemented at least in part with one or more computers, item catalog data from a plurality of merchant network sites utilizing corresponding application programming interfaces of the plurality of merchant network sites, individual merchant network sites being separate from the mediation component;
translating, by the mediation component, the item catalog data from the plurality of merchant network sites into a uniform format suitable for cross-site comparison to update a uniform item catalog in a unified data store;
obtaining, by the mediation component, user transaction history data from the plurality of merchant network sites utilizing corresponding application programming interfaces of the plurality of merchant network sites, the user transaction history data including user transactions previously conducted with the plurality of merchant network sites;
translating, by the mediation component, the user transaction history data into a uniform format suitable for cross-site comparison to update a uniform user transaction history in the unified data store;

obtaining, by the mediation component, user social activity data from a social network site utilizing an application programming interface of the social network site;

translating, by the mediation component, the user social activity data into a uniform format suitable for cross-site comparison to update uniform user social activity data in the unified data store;

causing, by the mediation component, presentation of a ranked set of items in the uniform item catalog, the ranking based at least in part on the uniform user transaction history and the uniform social activity data;

receiving, by the mediation component, an indication of a subset of the ranked set of items, the subset selected by a merchant in accordance with one or more campaign criteria;

configuring, by the mediation component, an interactive unit adapted to a user interface of the social network site, the mediation component being separate from the social network site, the interactive unit configured at least to facilitate a transaction with respect to an item selected by the mediation component from the subset of the ranked set of items;

enabling, with the mediation component, user access to the interactive unit at the social network site at least in part by providing the interactive unit from the mediation component to the social network site, the interactive unit having a format suited to incorporation in a graphical user interface of the social network site; and responsive to user interaction with the interactive unit, conducting, with the mediation component, the transaction with respect to the item based at least in part on information received by the mediation component from the interactive unit, wherein the mediation component is configured to conduct payment processing for the transaction such that the plurality of merchant network sites are freed from a responsibility to conduct payment processing for the transaction.

2. A method in accordance with claim 1, further comprising:

receiving, with the one or more computers, information corresponding to a set of items that are available for involvement in the transaction;

receiving, with the one or more computers, information corresponding to activity of the user with respect to the social network site; and selecting the item for the interactive unit from the set of items based at least in part on the received information corresponding to the set of items and the received information corresponding to the activity of the user with respect to the social network site.

3. A method in accordance with claim 2, wherein:

the received information corresponding to the activity of the user with respect to the social network site includes information corresponding to one or more relationships between the user and one or more other users of the social network site; and the item for the interactive unit is selected based at least in part on the information corresponding to one or more relationships between the user and the one or more other users of the social network site.

4. A method in accordance with claim 1, wherein:

the social network site maintains information streams for users, individual information streams comprising a plurality of discrete information units; and enabling user access to the interactive unit at the social network site comprises providing the interactive unit from the mediation component to the social network site in a format suited to insertion in an information stream of the user.

5. A method in accordance with claim 1, wherein conducting the transaction with respect to the item includes providing a purchase order for the item from the mediation component to a merchant computer system.

6. A method in accordance with claim 1, comprising:

responsive to user interaction with the interactive unit, creating, by the mediation component, a first transaction context for the transaction, the first transaction context including first transaction information that is updated by a first multi-step transaction process having at least three steps;

responsive to a step of the first multi-step transaction process, causing, by the mediation component, creation of a second transaction context for the transaction at a merchant network site separate from the mediation component, the second transaction context including second transaction information that is updated by a second multi-step transaction process having at least three steps, the second multi-step transaction process being different from the first multi-step transaction process; and conducting the transaction with respect to the item at least in part by progressing the first multi-step transaction process with the mediation component and asynchronously causing progression of the second multi-step transaction process at the merchant network site such that the first multi-step transaction process at the transaction mediation service includes at least one step that is dependent on a step of the second multi-step transaction process at the merchant network site, wherein the transaction mediation service maintains a transaction mediation module at the merchant network site that is additional with respect to modules originally implementing the merchant network site and is configured at least to cause progression of the second multi-step process at the merchant network site responsive to instructions sent by the transaction mediation service.

7. A method in accordance with claim 6, wherein the first transaction information comprises transaction information in a uniform format suited to translation to a plurality of different formats in use by a plurality of merchant network sites.

8. A method in accordance with claim 6, wherein the first multi-step transaction process is under direct control of the mediation component and the second multi-step transaction process is at least partially under independent control of the merchant network site.

9. A method in accordance with claim 6, wherein the first multi-step transaction process comprises a set of transaction steps compatible with a plurality of different multi-step transaction processes in use by a plurality of merchant network sites.

10. A method is accordance with claim 1, wherein the ranking of items in the uniform item catalog with respect to the user is further based at least in part on social network activity of an influencer in a social network of the user including identified correlations between the items in the uniform item catalog and the social network activity of the influencer.

11. A method is accordance with claim 10, wherein the ranking of items in the uniform item catalog with respect to the user is further based at least in part on merchant activity of an influencer in a social network of the user including identified correlations between the items in the uniform item catalog and the merchant activity of the influencer.

12. A system for facilitating a transaction, comprising:
   a social interface component configured at least to facilitate interaction with a social network site maintained by a first set of computers;
   a merchant interface component configured at least to facilitate interaction with a merchant network site maintained by a second set of computers; and
   a mediation component separate from the social network site and maintained by a third set of computers that is separate from the first set of computers and separate from the second set of computers, the mediation component configured to, at least:
      obtain item catalog data from a plurality of merchant network sites utilizing corresponding application programming interfaces of the plurality of merchant network sites, individual merchant network sites being separate from the mediation component;
      translate the item catalog data from the plurality of merchant network sites into a uniform format suitable for cross-site comparison to update a uniform item catalog in a unified data store;
      obtain user transaction history data from the plurality of merchant network sites utilizing corresponding application programming interfaces of the plurality of merchant network sites, the user transaction history data including user transactions previously conducted with the plurality of merchant network sites;
      translate the user transaction history data into a uniform format suitable for cross-site comparison to update a uniform user transaction history in the unified data store;
      obtain user social activity data from a social network site utilizing an application programming interface of the social network site;
      translate the user social activity data into a uniform format suitable for cross-site comparison to update uniform user social activity data in the unified data store;
      cause presentation of a ranked set of items in the uniform item catalog, the ranking based at least in part on the uniform user transaction history and the uniform social activity data;
      receive an indication of a subset of the ranked set of items, the subset selected by a merchant in accordance with one or more campaign criteria;
      configure an interactive unit adapted to a user interface of the social network site, the interactive unit configured at least to facilitate a transaction with respect to an item selected by the mediation component from the subset of the ranked set of items;
      enable user access to the interactive unit at the social network site with the social interface component at least in part by providing the interactive unit from the mediation component to the social network site, the interactive unit having a format suited to incorporation in a graphical user interface of the social network site; and
      responsive to user interaction with the interactive unit, conduct the transaction with respect to the item based at least in part on information received from the interactive unit and utilizing the merchant interface component, wherein the mediation component is configured to conduct payment processing for the transaction such that the plurality of merchant network sites are freed from a responsibility to conduct payment processing for the transaction.

13. A system in accordance with claim 12, wherein the social network site controls access to user data and the social interface component negotiates access to the user data utilizing one or more access credentials.

14. A system in accordance with claim 12, wherein the merchant network site comprises a transaction subsystem and conducting the transaction utilizing the merchant interface component includes interacting with the transaction subsystem of the merchant network site utilizing the merchant interface component.

15. A system in accordance with claim 12, wherein the interactive unit includes computer-executable instructions that facilitate the transaction with respect to the item.

16. A system in accordance with claim 12, wherein the information received from the interactive unit includes information obtained from the social network site by the interactive unit.

17. A system in accordance with claim 16, wherein:
   conducting the transaction with respect to the item includes providing a purchase order for the item to the merchant network site, the purchase order comprising a plurality of data fields; and
   the information obtained from the social network site by the interactive unit includes information corresponding to one or more of the plurality of data fields of the purchase order.

* * * * *